US009609348B2

(12) United States Patent
Shi et al.

(10) Patent No.: US 9,609,348 B2
(45) Date of Patent: Mar. 28, 2017

(54) SYSTEMS AND METHODS FOR VIDEO CONTENT ANALYSIS

(71) Applicant: INTERSIL AMERICAS LLC, Milpitas, CA (US)

(72) Inventors: Fang Shi, San Diego, CA (US); Jin Ming, ChengDu (CN); Qi Wu, ChengDu (CN); Fan You, San Diego, CA (US); Kai Bao, Torrance, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 14/472,313

(22) Filed: Aug. 28, 2014

(65) Prior Publication Data

US 2014/0369417 A1 Dec. 18, 2014

Related U.S. Application Data

(63) Continuation of application No. 13/225,269, filed on Sep. 2, 2011, now Pat. No. 8,824,554.

(30) Foreign Application Priority Data

Sep. 2, 2010 (WO) ................ PCT/CN2010/076555
Sep. 2, 2010 (WO) ................ PCT/CN2010/076564
(Continued)

(51) Int. Cl.
*H04N 19/51* (2014.01)
*H04N 19/52* (2014.01)
(Continued)

(52) U.S. Cl.
CPC ........... *H04N 19/52* (2014.11); *H04N 19/115* (2014.11); *H04N 19/124* (2014.11);
(Continued)

(58) Field of Classification Search
CPC .. H04N 19/115; H04N 19/124; H04N 19/164; H04N 19/176; H04N 19/198;
(Continued)

(56) References Cited

U.S. PATENT DOCUMENTS

| 4,837,632 A | 6/1989 | Kubo et al. |
|---|---|---|
| 5,128,754 A | 7/1992 | Dhein |

(Continued)

FOREIGN PATENT DOCUMENTS

| CN | 1418012 | 5/2003 |
|---|---|---|
| CN | 1643912 | 7/2005 |

(Continued)

OTHER PUBLICATIONS

JP2010128727MT, Fuji Miyuki, Oct. 6, 2010, (note that JP2010128727MT is machine translation for the Japanese application JP2010128727A, it is downloaded from JPO website).*

(Continued)

*Primary Examiner* — Shan Elahi
(74) *Attorney, Agent, or Firm* — Foley & Lardner LLP; Mark J. Danielson

(57) ABSTRACT

Video analytics systems and methods are described that typically comprise a video encoder operable to generate macroblock video analytics metadata (VAMD) from a video frame. Functional modules receive the VAMD and an encoded version of the video frame is configured to generate video analytics information related to the frame using the VAMD and the encoded video frame. The downstream decoder can use the VAMD to obtain a global motion vector related to the frame, detect and track motion of an object within the frame and monitor a line provided or found within the frame. Traversals of the line by a moving object can be detected and counted using information in the VAMD and the line may be part of a polygon that delineates an area to (Continued)

be monitored within the encoded frame. The VAMD can comprise macroblock level and video frame level information.

20 Claims, 4 Drawing Sheets

(30) Foreign Application Priority Data

Sep. 2, 2010 (WO) ................ PCT/CN2010/076567
Sep. 2, 2010 (WO) ................ PCT/CN2010/076569

(51) Int. Cl.

| | | |
|---|---|---|
| H04N 19/176 | (2014.01) | |
| H04N 19/115 | (2014.01) | |
| H04N 19/61 | (2014.01) | |
| H04N 19/124 | (2014.01) | |
| H04N 19/164 | (2014.01) | |
| H04N 19/196 | (2014.01) | |
| H04N 5/14 | (2006.01) | |

(52) U.S. Cl.
CPC ......... *H04N 19/164* (2014.11); *H04N 19/176* (2014.11); *H04N 19/198* (2014.11); *H04N 19/51* (2014.11); *H04N 19/61* (2014.11); *H04N 5/145* (2013.01)

(58) Field of Classification Search
CPC ........ H04N 19/51; H04N 19/52; H04N 19/61; H04N 5/145; H04N 7/50; H04N 7/26244; H04N 7/26015
USPC ..................................................... 375/240.16
See application file for complete search history.

(56) References Cited

U.S. PATENT DOCUMENTS

| | | | |
|---|---|---|---|
| 5,815,604 A | 9/1998 | Simons et al. | |
| 5,854,856 A | 12/1998 | Moura et al. | |
| 6,167,087 A | 12/2000 | Kato | |
| 6,400,996 B1* | 6/2002 | Hoffberg et al. | ................ 700/83 |
| 6,795,504 B1 | 9/2004 | Xu et al. | |
| 7,460,601 B2 | 12/2008 | Taniguchi | |
| 7,532,808 B2 | 5/2009 | Lainema | |
| 7,672,370 B1* | 3/2010 | Russell et al. ............ | 375/240.01 |
| 7,936,372 B2 | 5/2011 | Murakami et al. | |
| 8,128,503 B1 | 3/2012 | Haot et al. | |
| 8,325,228 B2 | 12/2012 | Mariadoss | |
| 8,503,539 B2* | 8/2013 | Tran ................... | H04N 5/23238 |
| | | | 375/240.26 |
| 8,634,476 B2* | 1/2014 | Tran ................... | H04N 5/23238 |
| | | | 375/240.26 |
| 8,824,554 B2* | 9/2014 | Shi ......................... | H04N 19/52 |
| | | | 375/240.01 |
| 2002/0181745 A1 | 12/2002 | Hu | |
| 2003/0056511 A1 | 3/2003 | Bruck et al. | |
| 2003/0156648 A1 | 8/2003 | Holcomb et al. | |
| 2003/0202594 A1 | 10/2003 | Lainema | |
| 2004/0170330 A1 | 9/2004 | Fogg | |
| 2004/0196908 A1 | 10/2004 | Lin et al. | |
| 2005/0047504 A1 | 3/2005 | Sung et al. | |
| 2005/0053295 A1 | 3/2005 | Holcomb | |
| 2005/0203927 A1 | 9/2005 | Sull et al. | |
| 2006/0023786 A1* | 2/2006 | Li et al. ............ | 375/240.16 |
| 2006/0056511 A1* | 3/2006 | Rehan et al. ............ | 375/240.12 |
| 2006/0062296 A1* | 3/2006 | Li et al. ............ | 375/240.12 |
| 2006/0062478 A1 | 3/2006 | Cetin et al. | |
| 2006/0072663 A1* | 4/2006 | Li et al. ............ | 375/240.16 |
| 2006/0072673 A1* | 4/2006 | Holcomb ............ | H04N 19/176 |
| | | | 375/240.25 |
| 2006/0078051 A1 | 4/2006 | Liang et al. | |
| 2006/0114989 A1 | 6/2006 | Panda | |
| 2006/0232673 A1 | 10/2006 | Lipton et al. | |
| 2006/0245502 A1 | 11/2006 | Cheng et al. | |
| 2007/0074266 A1* | 3/2007 | Raveendran ........... | H04N 5/144 |
| | | | 725/135 |
| 2007/0127774 A1 | 6/2007 | Zhang et al. | |
| 2007/0237221 A1 | 10/2007 | Hsu et al. | |
| 2007/0291118 A1* | 12/2007 | Shu et al. ..................... | 348/156 |
| 2008/0049834 A1* | 2/2008 | Holcomb et al. .......... | 375/240.2 |
| 2008/0069211 A1 | 3/2008 | Kim et al. | |
| 2008/0074496 A1* | 3/2008 | Venetianer et al. .......... | 348/150 |
| 2008/0184245 A1 | 7/2008 | St-Jean | |
| 2008/0192646 A1 | 8/2008 | Song et al. | |
| 2008/0273088 A1* | 11/2008 | Shu et al. ..................... | 348/154 |
| 2008/0298464 A1 | 12/2008 | Hinz et al. | |
| 2009/0002157 A1* | 1/2009 | Donovan et al. ............. | 340/540 |
| 2009/0015671 A1* | 1/2009 | Addy ..................... | H04N 7/181 |
| | | | 348/143 |
| 2009/0031381 A1* | 1/2009 | Cohen ............... | H04L 29/08846 |
| | | | 725/115 |
| 2009/0070163 A1* | 3/2009 | Angell et al. ..................... | 705/7 |
| 2009/0079867 A1 | 3/2009 | Leone et al. | |
| 2009/0115570 A1* | 5/2009 | Cusack, Jr. ........ | G07C 9/00103 |
| | | | 340/5.2 |
| 2009/0162029 A1* | 6/2009 | Glen ................... | H04N 5/44543 |
| | | | 386/231 |
| 2009/0189981 A1* | 7/2009 | Siann ..................... | H04N 7/183 |
| | | | 348/143 |
| 2009/0219387 A1* | 9/2009 | Marman et al. ............. | 348/143 |
| 2009/0219639 A1* | 9/2009 | Marman ................ | H04N 5/772 |
| | | | 360/69 |
| 2009/0245573 A1* | 10/2009 | Saptharishi et al. .......... | 382/103 |
| 2009/0296808 A1 | 12/2009 | Regunathan et al. | |
| 2010/0020172 A1* | 1/2010 | Mariadoss .................... | 348/143 |
| 2010/0106849 A1* | 4/2010 | Chou ................... | H04N 21/437 |
| | | | 709/231 |
| 2010/0150233 A1 | 6/2010 | Kim et al. | |
| 2010/0194868 A1* | 8/2010 | Peled ........................ | G06F 8/20 |
| | | | 348/61 |
| 2010/0215104 A1 | 8/2010 | Osamoto et al. | |
| 2010/0290530 A1 | 11/2010 | Huang et al. | |
| 2011/0096168 A1* | 4/2011 | Siann ..................... | H04N 7/183 |
| | | | 348/158 |
| 2011/0103468 A1* | 5/2011 | Polisetty et al. .......... | 375/240.03 |
| 2011/0145431 A1* | 6/2011 | Momchilov ........... | H04L 65/605 |
| | | | 709/231 |
| 2011/0157178 A1 | 6/2011 | Tuzel et al. | |
| 2011/0211036 A1* | 9/2011 | Tran ................... | H04N 5/23238 |
| | | | 348/14.08 |
| 2011/0221895 A1* | 9/2011 | Sharma ................... | H04N 7/188 |
| | | | 348/143 |
| 2011/0273563 A1* | 11/2011 | Murphy ..................... | H04N 7/18 |
| | | | 348/143 |
| 2012/0057634 A1* | 3/2012 | Shi et al. .................. | 375/240.16 |
| 2012/0057640 A1* | 3/2012 | Shi et al. .................. | 375/240.26 |
| 2012/0086780 A1* | 4/2012 | Sharma ............... | H04N 13/0022 |
| | | | 348/46 |
| 2012/0194676 A1* | 8/2012 | Laganiere ........... | H04L 12/6418 |
| | | | 348/143 |
| 2012/0265901 A1* | 10/2012 | Swenson ............... | H04L 65/1076 |
| | | | 709/246 |

FOREIGN PATENT DOCUMENTS

| | | |
|---|---|---|
| CN | 1653818 A | 8/2005 |
| CN | 101014128 | 8/2007 |
| CN | 101043633 | 9/2007 |
| CN | 101090498 | 12/2007 |
| CN | 101098469 A | 1/2008 |
| CN | 101112101 | 1/2008 |
| CN | 101179729 | 5/2008 |
| CN | 101325689 A | 12/2008 |
| CN | 101389023 | 3/2009 |
| CN | 101389029 | 3/2009 |
| CN | 101405779 | 4/2009 |
| CN | 101448145 | 6/2009 |
| CN | 101778260 | 7/2010 |
| CN | 101802843 | 8/2010 |

(56) References Cited

FOREIGN PATENT DOCUMENTS

| JP | 2010-128727 | 6/2010 | |
|---|---|---|---|
| JP | 2010128727 A * | 6/2010 | ........... G08B 13/196 |
| WO | WO-2008/046243 | 4/2008 | |

OTHER PUBLICATIONS

Pham et al, Joint Optimization of Iterative Source and Channel Decoding Using Over-Complete Source-Mapping, 2007.*

Wong et al, On a Region-Of-Interest Bases Approch to Robust Wireless Video Transmission, 2004.*

International Search Report and Written Opinion for PCT/CN2010/076569, mailed May 12, 2011, 10 pages.

IP-Surveillance design guide, Setting up an IP-Surveillance system using Axis network cameras, video encoders and AXIS Camera Station software, Jul. 25, 2008.

JP2010128727MT, Fuji Miyuki, Oct. 6, 2010, (note that it is an English translation of the JP 2010128727 and it was download from JP websites).

TW5864B1, 5D1 H264 Encoder with 4-Channel A/V Decoder & 12 Channel External VD Inputs for Security Applications, Dec. 14, 2011.

He et al, Video Compression and Data Flow for Video Surveillance, Sep. 2007.

International Search Report and Written Opinion for PCT/CN2010/076555, mailed Jun. 9, 2011, 11 pages.

International Search Report and Written Opinion for PCT/CN2010/076564, mailed Jun. 9, 2011, 11 pages.

International Search Report and Written Opinion for PCT/CN2010/076567, mailed Jun. 9, 2011, 12 pages.

* cited by examiner ically used throughout the drawings to refer to same or like parts. Where certain elements of these embodiments can be partially or fully implemented using known components, only those portions of such known components that are necessary for an understanding of the disclosed embodiments will be described, and detailed descriptions of other portions of such known components will be omitted so as not to obscure the disclosed embodiments. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any

SYSTEMS AND METHODS FOR VIDEO CONTENT ANALYSIS

CROSS-REFERENCE TO RELATED APPLICATIONS

The present Application is a continuation of U.S. patent application Ser. No. 13/225,269 (scheduled for issuance as U.S. Pat. No. 8,824,554), which claims priority from PCT/CN2010/076567 (title: "Systems And Methods for Video Content Analysis) which was filed in the Chinese Receiving Office on Sep. 2, 2010, from PCT/CN2010/076569 (title: "Video Classification Systems and Methods") which was filed in the Chinese Receiving Office on Sep. 2, 2010, from PCT/CN2010/076564 (title: "Rho-Domain Metrics") which was filed in the Chinese Receiving Office on Sep. 2, 2010, and from PCT/CN2010/076555 (title: "Video Analytics for Security Systems and Methods") which was filed in the Chinese Receiving Office on Sep. 2, 2010, each of these applications being hereby incorporated herein by reference. The present Application is also related to U.S. patent application Ser. No. 13/225,202 entitled "Video Classification Systems and Methods," U.S. patent application Ser. No. 13/225,222 entitled "Rho-Domain Metrics," and U.S. patent application Ser. No. 13/225,238 entitled "Video Analytics for Security Systems and Methods," which were concurrently filed with, and incorporated by reference in, the parent U.S. application Ser. No. 13/225,269, and which are expressly incorporated by reference herein.

DETAILED DESCRIPTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the disclosed embodiments will be described, and detailed descriptions of other portions of such known components will be omitted so as not to obscure the disclosed embodiments. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, certain embodiments of the present invention encompass present and future known equivalents to the components referred to herein by way of illustration.

Certain embodiments of the invention provide systems and methods for video content analysis, which is also known as video analytics. Video analytics can facilitate the analysis of video and enables the detection and determination of temporal events that are not based on, or limited to, a single image. Video analytics can be used in a wide range of domains including entertainment, health care, retail, automotive, transport, home automation (domotics), safety and security. Algorithms associated with video analytics can be implemented as software in a variety of computing platforms, including general purpose machines, mobile computing devices, smart phones, gaming devices, embedded systems and/or in hardware used in specialized video processing units. According to certain aspects of the invention, combinations of hardware and software can be used in video analytics systems to improve video analytics accuracy, speed and extendibility.

Figure 1:
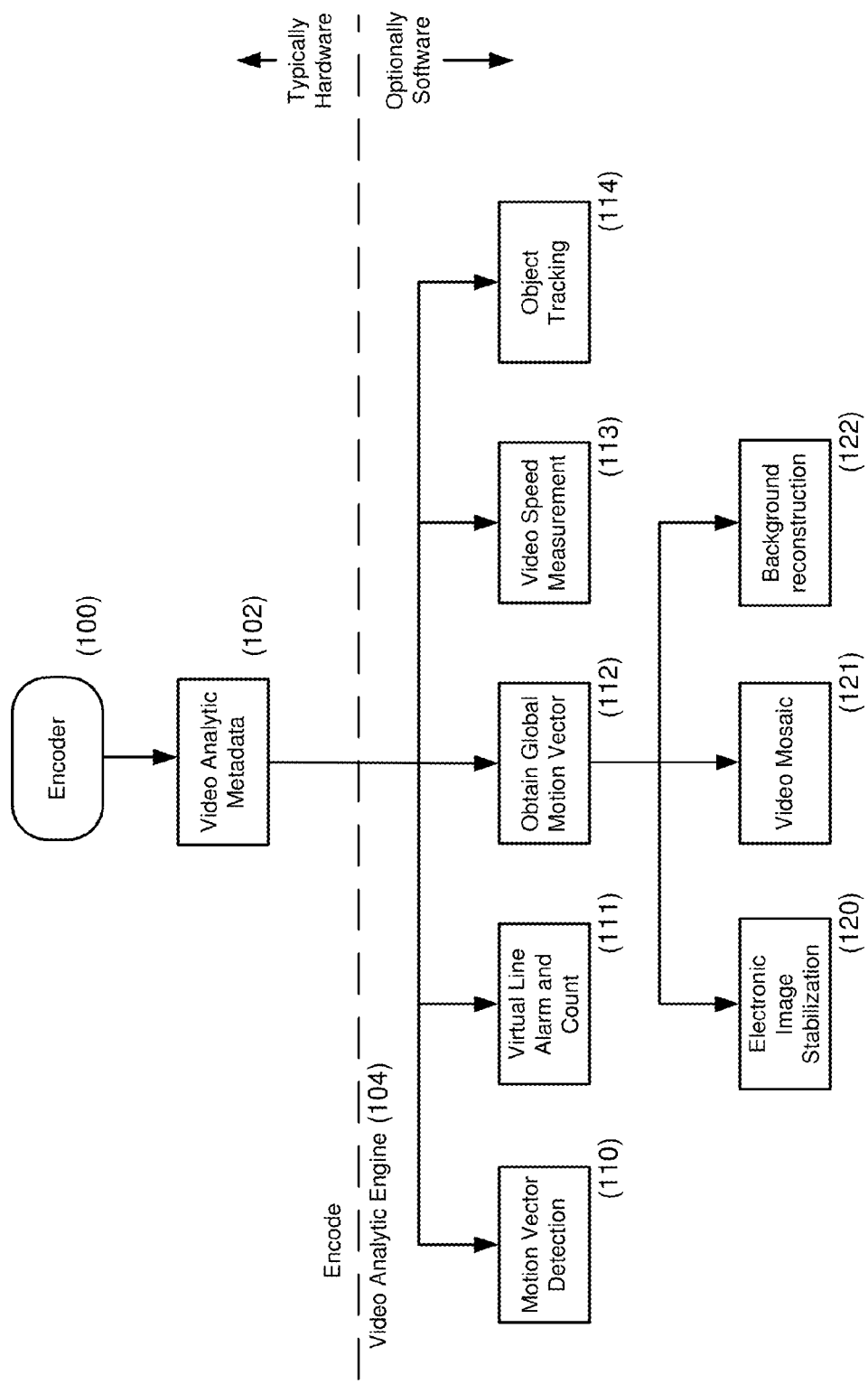
FIG. 1 is a diagram illustrating a system architecture describing according to certain aspects of the invention.

FIG. 1 is a schematic showing a simplified example of a system architecture that can be used to perform certain video analytics functions. In the example, video encoder 100 performs macroblock ("MB") based video encoding processes. Encoder 100 is typically provided in hardware, such as a camera, digital video recorder, etc., and can comprise processors, non-transitory storage and other components as described in more detail herein in relation to FIG. 2. Video encoder 100 may comprise an adaptable and/or configurable commercially available hardware encoding chip such as the TW5864 marketed by Intersil Techwell. According to certain aspects of the invention, video encoder 100 is adapted and/or configured to generate a package of video analytics metadata 102 (VAMD) for each MB processed. VAMD 102 may comprise a count of non-zero coefficients, MB type, motion vector, selected DC/AC coefficients after discrete cosine transform ("DCT transform"), a sum of absolute differences (SAD) value after motion estimation for each MB, and so on. Video encoder 100 may provide video frame level information in VAMD 102. At the frame level, VAMD 102 can include an A/D Motion Flag, a block based motion indicator generated in an A/D video front end, etc. VAMD 102 can be stored and/or aggregated in storage that can maintained by the video encoder 100 or another processing device.

VAMD 102 can be transmitted by hardware encoding module (video encoder 100), or another processor communicatively coupled to the encoding module 100, to one or more processing modules 110-114 for further video analytics processing. Further processing may be performed using any suitable combination of hardware and software components. While FIG. 1 depicts processing modules 110-114 as embodied in software components, it is contemplated that certain advantages may be obtained in embodiments that embody at least a portion of processing modules 110-114 in hardware; such hardware can include sequencers, controllers, custom logic devices, and customizable devices that can include one or more embedded processors and/or digital signal processors. Advantages of embedding portions of processing modules 110-114 in hardware include accelerated processing, application specific optimizations, enhanced cost and size efficiencies, improved security and greater reliability. In the depicted example, video analytics processing includes hardware/software combinations for motion detection, visual line detection, virtual counting, motion tracking, motion based object segmentation, etc.

In certain embodiments, a global motion vector processor 112 can be generated from VAMD 102. Global motion vectors can be used for electronic image stabilization 120, video mosaic 121, background reconstruction 122, etc. Other processors may extract information from VAMD 102, including processors for detecting motion vectors 110, counting visual lines and generating alarms related to visual lines 111, measuring speed of objects using video 113 and tracking motion of objects 114.

Accordingly, certain embodiments of the invention provide co-existing video analytics systems in which VAMD 102 functions as a common interface. VAMD 102 can include both frame-level information, such as ADMotion-flag, and MB-level information, such as motion vector, MB-type, etc., to efficiently assist processing modules for video security analytics applications.

Systems and methods according to certain aspects of the invention can provide significant advantages over conventional pixel domain video analytics algorithms. For example, certain embodiments require less memory bandwidth than conventional systems. Conventional video analytics algorithms generally use pixel domain based techniques that operate at the pixel level that require large quantities of memory for processing. For example, to process a standard television (D1 resolution) video, 704×576 bytes of memory bandwidth (405,504 bytes) is required to process each PAL frame (or 704×480 for an NTSC frame), even where only luma information is needed. However, in certain embodiments of the present invention, most of the VAMD is MB based—depending on the video analytics algorithms of interest—and there are only $$\frac{704 \times 576}{256} = 1,584 \text{ bytes},$$

where each MB is 16×16 pixels. Consequently, the present invention requires orders of magnitude less memory bandwidth for the same video analytics function. The memory bandwidth savings can dramatically increase the number of channels to be processed for VA.

Certain embodiments provide systems and methods for implementing a low cost video analytics systems using VAMD 102 created during video compression. When video is pre-processed with video compression, such as H-264 encoding, the VAMD 102 may be obtained as a by-product of front-end video compression (encoding). The cost of deriving VAMD 102 during compression can be very low, and the availability of the VAMD 102 derived in this manner may be very valuable when used with certain analytic functions. For example, a number of video analytics algorithms require motion information to detect and track motion objects. Performing motion estimation to obtain the local motion vectors can comprise very computationally complicated processes. In certain embodiments of the present invention, a video encoder can generate motion vectors in sub-pixel granularity for each 4×4 or 8×8 blocks based on the applicable video standard, and certain filtering operations can be applied to the local motion vectors to generate one motion vector per MB as part of the VAMD 102.

Certain embodiments of the invention yield improved software video analytics efficiencies. For example, in software video analytics modules 110-114, motion vectors provided in VAMD 102 can be extracted and used instead of calculating motion vectors from a video feed. Certain advanced filtering operations may be applied to generate the desired motion information to facilitate motion detection, virtual line alarm and counting. This permits the application of the processor to more advanced analytic functions instead of collecting primitive motion data. Moreover, certain of the motion detection processing can more easily be performed using configurable hardware systems such as ASICs, PLDs, PGAs, FPGAs, sequencers and controllers. In addition, operating on motion vector per MB can greatly improve video analytics efficiency, enabling more advanced algorithms and video analytics for multiple channels simultaneously.

Certain embodiments of the invention collect specific VAMD 102 information to improve video analytics efficiency and accuracy in comparison to conventional motion vector ("MV") assisted approaches. Certain embodiments can improve video analytics accuracy by augmenting motion vector per MB and mode decision sum of absolute differences ("SAD") information extracted by a hardware encoding module. A restriction to MV and SAD information has certain disadvantages, including in P-frames, for example, where the edges of newly appearing objects are usually encoded as an I-type MB with zero value motion vector and uncertain SAD value, and where a background MB has both zero motion vector and very small SAD values. Using MV and SAD only, it can be difficult to distinguish a new moving object from the background. In certain embodiments of the present invention, VAMD 102 comprises MV information and non-zero-coefficient (NZ), MB-type and other DC/AC information, allowing newly appearing objects to be distinguished from the background by checking MB-type, MV and non-zero coefficient ("NZ") information. Furthermore, most video content has some background noise, which is known to produce irregular motion vector and SAD for motion estimation algorithms. Using NZ and DC values from VAMD 102, noise reduction for video analytics algorithms can be achieved.

Certain embodiments of the invention facilitate the use of advanced video analytics algorithms, balancing of transmission bandwidth and increased computational complexity. Some video analytics algorithms, such as motion based object segmentation, motion object tracking and global motion estimation require more information than provided by MV and SAD. Certain embodiments of the present invention provide additional information in a customizable and configurable format. Users can determine which information is packed into VAMD to balance transmission bandwidth and to support increased software computational complexity through partitioning of functionality between hardware and software modules.

Algorithm Comparisons

Certain embodiments of the invention can improve memory and transmission bandwidth utilization. Conventional video analytics algorithms utilize pixel domain techniques. Generally, 704×576 bytes per frame of data would be needed to transmit from encoding module to analytics module for D1 resolution standard video application. This bandwidth requirement often limits video analytics devices to processing only one channel at a time, increasing the cost of product. In one example embodiment of the present invention, using the above described TW5864 device, 4-bytes of VAMD per MB is generated from the encoding module yielding the equivalent of 1/64 of the total memory bandwidth that would be needed to process D1 video in a conventional system. The reduced bandwidth requirement enables embodiments of the current invention to simultaneously process 16 channels for video analytics, which would be present a difficult obstacle to pixel domain implementations.

Certain embodiments of the invention improve motion detection accuracy. Motion detection employs algorithms to automatically detect moving objects, such as humans, animals or vehicles entering into a predefined alarm region. Issues with conventional systems include pixel domain algorithm difficulties in handling changing of light conditions. Under fluorescent lamps or in dim light environments, background pixel values can vary dramatically and, without the benefit of motion, NZ or DC information, pixel domain algorithms generally have large false alarm ratios.

Systems that use an algorithm that responds only to MV and SAD information generally also have serious issues. Newly appearing objects in a P-frame are usually encoded as I-type MB with zero motion vector and may also have a very small SAD value. Without MB-type and NZ information, motion detection sensitivity is low and/or false alarm rates are high. As with the pixel domain algorithm under frequent lighting condition change environment, both MV and SAD are ill-defined metrics for video analytics application.

In contrast, certain systems constructed according to certain aspects of the invention employ algorithms based on the proposed VAMD 102. MV, NZ, DC information is easily accessible and can be processed to accurately detect a moving object entering into an alarm region. NZ and DC information are useful to overcome light changing conditions, as opposite to pixel domain and MV/SAD only algorithms.

System Description

Figure 2:
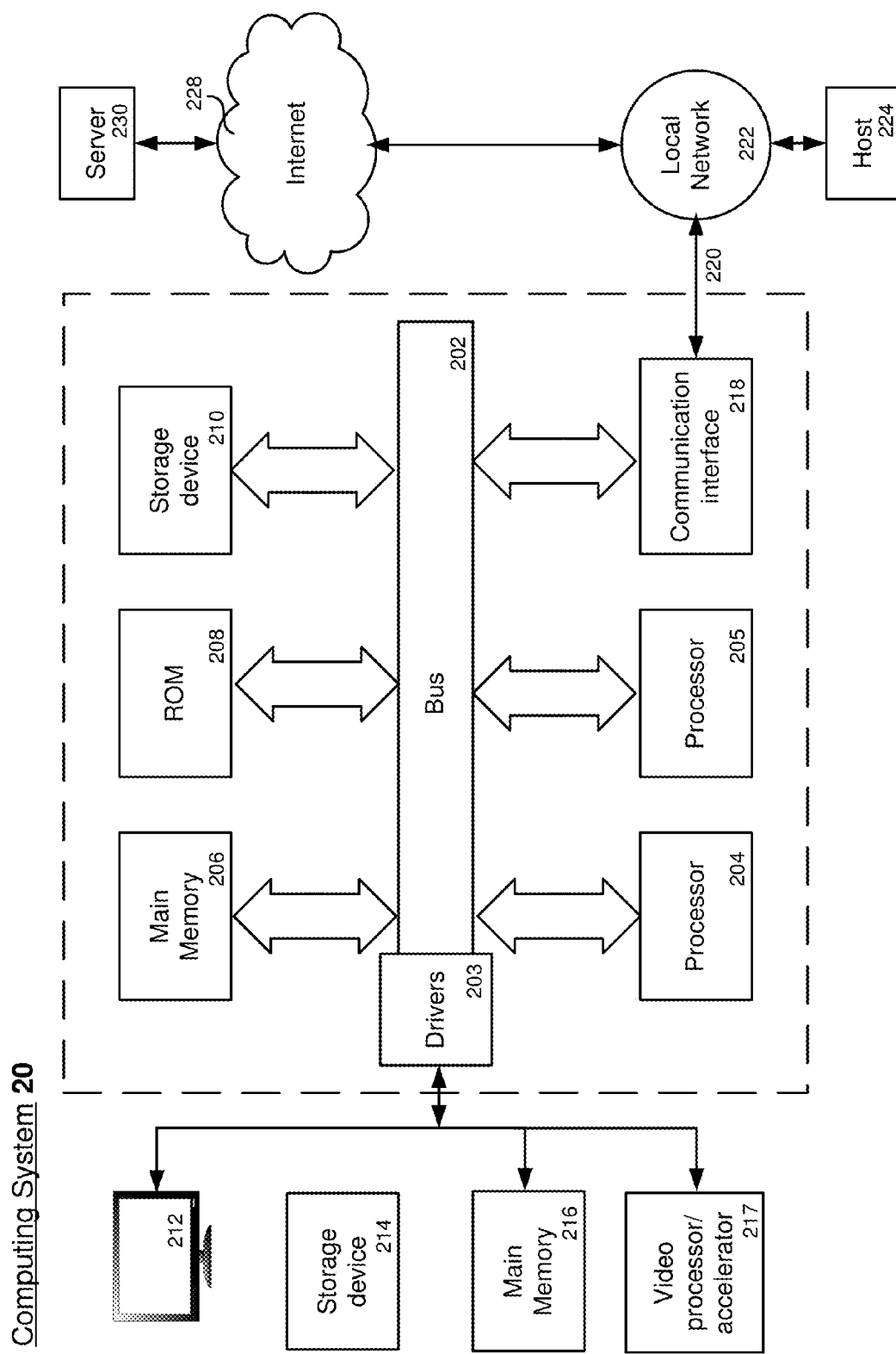
FIG. 2 is a simplified block schematic illustrating a processing system employed in certain embodiments of the invention.

Turning now to FIG. 2, certain embodiments of the invention employ a processing system that includes at least one computing system 20 deployed to perform certain of the steps described above. Computing system 20 may be a commercially available system that executes commercially available operating systems such as Microsoft Windows®, UNIX or a variant thereof, Linux, a real time operating system and or a proprietary operating system. The architecture of the computing system may be adapted, configured and/or designed for integration in the processing system, for embedding in one or more of an image capture system, communications device and/or graphics processing systems. In one example, computing system 20 comprises a bus 202 and/or other mechanisms for communicating between processors, whether those processors are integral to the computing system 20 (e.g. 204, 205) or located in different, perhaps physically separated computing systems 200. Typically, processor 204 and/or 205 comprises a CISC or RISC computing processor and/or one or more digital signal processors. In some embodiments, processor 204 and/or 205 may be embodied in a custom device and/or may perform as a configurable sequencer. Device drivers 203 may provide output signals used to control internal and external components and to communicate between processors 204 and 205.

Computing system 20 also typically comprises memory 206 that may include one or more of random access memory ("RAM"), static memory, cache, flash memory and any other suitable type of storage device that can be coupled to bus 202. Memory 206 can be used for storing instructions and data that can cause one or more of processors 204 and 205 to perform a desired process. Main memory 206 may be used for storing transient and/or temporary data such as variables and intermediate information generated and/or used during execution of the instructions by processor 204 or 205. Computing system 20 also typically comprises non-volatile storage such as read only memory ("ROM") 208, flash memory, memory cards or the like; non-volatile storage may be connected to the bus 202, but may equally be connected using a high-speed universal serial bus (USB), Firewire or other such bus that is coupled to bus 202. Non-volatile storage can be used for storing configuration, and other information, including instructions executed by processors 204 and/or 205. Non-volatile storage may also include mass storage device 210, such as a magnetic disk, optical disk, flash disk that may be directly or indirectly coupled to bus 202 and used for storing instructions to be executed by processors 204 and/or 205, as well as other information.

In some embodiments, computing system 20 may be communicatively coupled to a display system 212, such as an LCD flat panel display, including touch panel displays, electroluminescent display, plasma display, cathode ray tube or other display device that can be configured and adapted to receive and display information to a user of computing system 20. Typically, device drivers 203 can include a display driver, graphics adapter and/or other modules that maintain a digital representation of a display and convert the digital representation to a signal for driving a display system 212. Display system 212 may also include logic and software to generate a display from a signal provided by system 200. In that regard, display 212 may be provided as a remote terminal or in a session on a different computing system 20. An input device 214 is generally provided locally or through a remote system and typically provides for alphanumeric input as well as cursor control 216 input, such as a mouse, a trackball, etc. It will be appreciated that input and output can be provided to a wireless device such as a PDA, a tablet computer or other system suitable equipped to display the images and provide user input.

In certain embodiments, computing system 20 may be embedded in a system that captures and/or processes images, including video images. In one example, computing system may include a video processor or accelerator 217, which may have its own processor, non-transitory storage and input/output interfaces. In another example, video processor or accelerator 217 may be implemented as a combination of hardware and software operated by the one or more processors 204, 205. In another example, computing system 20 functions as a video encoder, although other functions may be performed by computing system 20. In particular, a video encoder that comprises computing system 20 may be embedded in another device such as a camera, a communications device, a mixing panel, a monitor, a computer peripheral, and so on.

According to one embodiment of the invention, portions of the described invention may be performed by computing system 20. Processor 204 executes one or more sequences of instructions. For example, such instructions may be stored in main memory 206, having been received from a computer-readable medium such as storage device 210. Execution of the sequences of instructions contained in main memory 206 causes processor 204 to perform process steps according to certain aspects of the invention. In certain embodiments, functionality may be provided by embedded computing systems that perform specific functions wherein the embedded systems employ a customized combination of hardware and software to perform a set of predefined tasks. Thus, embodiments of the invention are not limited to any specific combination of hardware circuitry and software.

The term "computer-readable medium" is used to define any medium that can store and provide instructions and other data to processor 204 and/or 205, particularly where the instructions are to be executed by processor 204 and/or 205 and/or other peripheral of the processing system. Such medium can include non-volatile storage, volatile storage and transmission media. Non-volatile storage may be embodied on media such as optical or magnetic disks, including DVD, CD-ROM and BluRay. Storage may be provided locally and in physical proximity to processors 204 and 205 or remotely, typically by use of network connection. Non-volatile storage may be removable from computing system 204, as in the example of BluRay, DVD or CD storage or memory cards or sticks that can be easily connected or disconnected from a computer using a standard interface, including USB, etc. Thus, computer-readable media can include floppy disks, flexible disks, hard disks, magnetic tape, any other magnetic medium, CD-ROMs, DVDs, BluRay, any other optical medium, punch cards, paper tape, any other physical medium with patterns of holes, RAM, PROM, EPROM, FLASH/EEPROM, any other memory chip or cartridge, or any other medium from which a computer can read.

Transmission media can be used to connect elements of the processing system and/or components of computing system 20. Such media can include twisted pair wiring, coaxial cables, copper wire and fiber optics. Transmission media can also include wireless media such as radio, acoustic and light waves. In particular radio frequency (RF), fiber optic and infrared (IR) data communications may be used.

Various forms of computer readable media may participate in providing instructions and data for execution by processor 204 and/or 205. For example, the instructions may initially be retrieved from a magnetic disk of a remote computer and transmitted over a network or modem to computing system 20. The instructions may optionally be stored in a different storage or a different part of storage prior to or during execution.

Computing system 20 may include a communication interface 218 that provides two-way data communication over a network 220 that can include a local network 222, a wide area network or some combination of the two. For example, an integrated services digital network (ISDN) may used in combination with a local area network (LAN). In another example, a LAN may include a wireless link. Network link 220 typically provides data communication through one or more networks to other data devices. For example, network link 220 may provide a connection through local network 222 to a host computer 224 or to a wide are network such as the Internet 228. Local network 222 and Internet 228 may both use electrical, electromagnetic or optical signals that carry digital data streams.

Computing system 20 can use one or more networks to send messages and data, including program code and other information. In the Internet example, a server 230 might transmit a requested code for an application program through Internet 228 and may receive in response a downloaded application that provides or augments functional modules such as those described in the examples above. The received code may be executed by processor 204 and/or 205.

An Example of a Video Analytics Architecture

Certain embodiments of the invention comprise systems having an architecture that is operable to perform video analytics. Video analytics may also be referred to as video content analysis. An analytics architecture may greatly improve video analytics efficiency for client side processing applications and systems when a server encodes captured video images. By improving and/or optimizing client side video analytics efficiency, client-side performance can be greatly improved, consequently enabling processing of an increased number of video channels. Moreover, VAMD created on the server side according to certain aspects of the invention can enable high accuracy video analytics. According to certain aspects of the invention, the advantages of a layered video analytics system architecture can include facilitating and/or enabling a balanced partition of video analytics at multiple layers. These layers may include server and client layers, pixel domain layers and motion domain layers. For example, global analytics defined to include information related to background frame, segmented object descriptors and camera parameters can enable cost efficient yet complex video analytics in the receiver side for many advanced video intelligent applications and can enable an otherwise difficult or impossible level of video analytics efficiency in terms of computational complexity and analytic accuracy.

Figure 3:
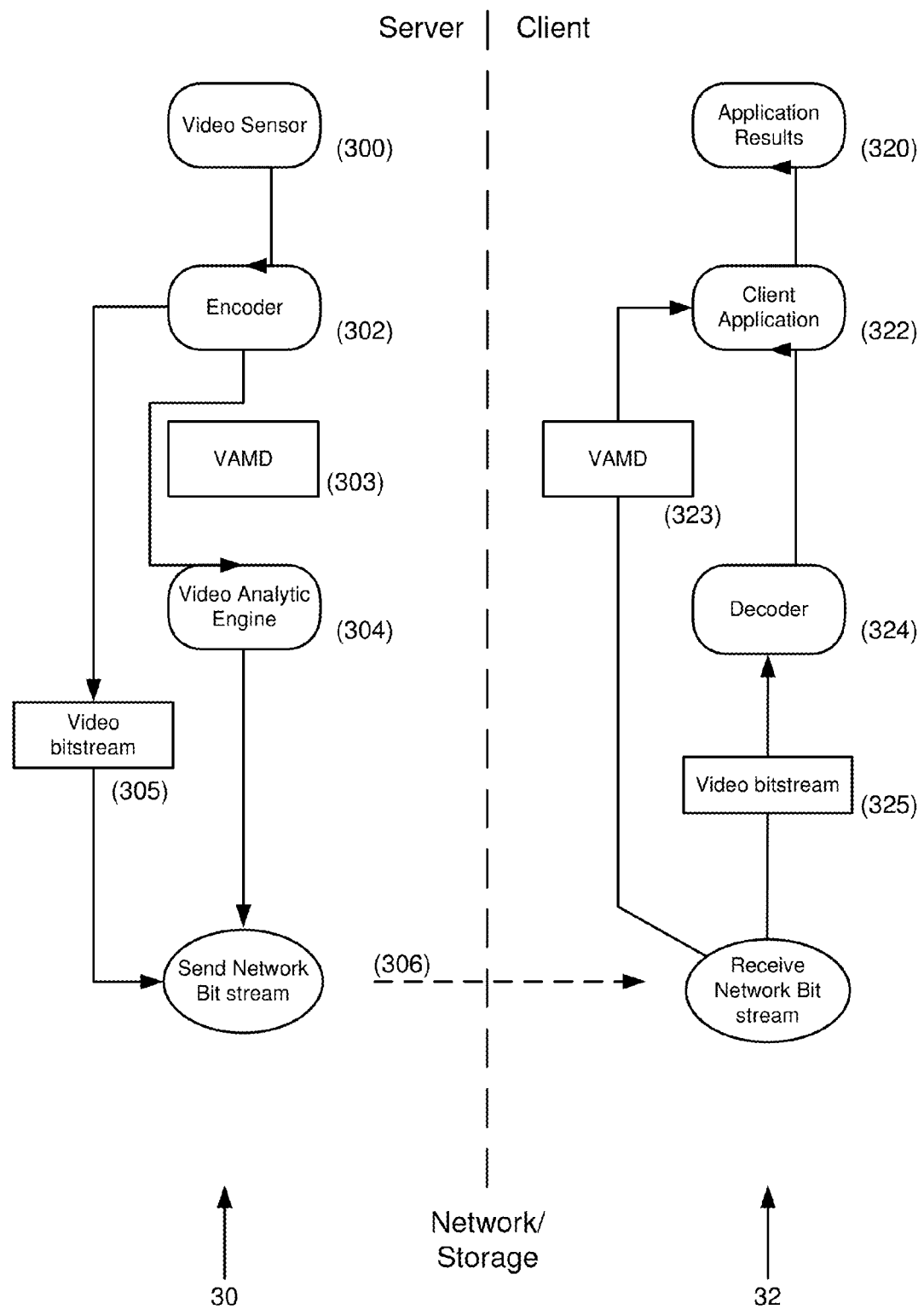
FIG. 3 is a block schematic illustrating a simplified example of a video analytics architecture according to certain aspects of the invention.

A simplified example of a video analytics architecture is shown in FIG. 3. In the example, the system is partitioned into server side 30 and client side 32 elements. The terms server and client are used here to include hardware and software systems, apparatus and other components that perform types of functions that can be attributed to server side 30 and client side 32 operations. It will be appreciated that certain elements may be provided on either or both server side 30 and client side 32, and that at least some client and server functionality may be committed to hardware components such as application specific integrated circuits, sequencers, custom logic devices as needed, typically to improve one or more of efficiency, reliability, processing speed and security. For example, the server side 30 components may be embodied in a camera.

On server side 30, a video sensor 300 can be configured to capture information representative a sequence of images, including video data, and passes the information to a video encoder module 302 adapted for use in embodiments of the invention. One example of such video encoder module 302 is the TW5864 from Intersil Techwell Inc., which can be adapted and/or configured to generate VAMD 303 related to video bitstream 305. In certain embodiments, video encoder 302 can be configured to generate one or more compressed video bitstream 305 that complies with industry standards and/or that is generated according to a proprietary specification. The video encoder 302 is typically configurable to produce VAMD 303 that can comprise pixel domain video analytics information, such as information obtained directly from an analog-to-digital ("A/D") front end (e.g. at the video sensor 300) and/or from an encoding engine 302 as the encoding engine 302 is performing video compression to obtain video bitstream 303. VAMD 303 may comprise block base video analytics information including, for example, MB-level information such as motion vector, MB-type and/or number of non-zero coefficients, etc. A MB typically comprises a 16×16 pixel block.

In certain embodiments, VAMD 303 can comprise any video encoding intermediate data such as MB-type, motion vectors, non-zero coefficient (as per the H.264 standard), quantization parameter, DC or AC information, motion estimation metric sum of absolute value ("SAD"), etc. VAMD 303 can also comprise useful information such as motion flag information generated in an analog to digital front end module, such module being found, for example, in the TW5864 device referenced above. VAMD 303 is typically processed in a video analytics engine ("VAE") 304 to generate more advanced video intelligent information that may include, for example, motion indexing, background extraction, object segmentation, motion detection, virtual line detection, object counting, motion tracking and speed estimation.

The VAE 304 can be configured to receive the VAMD 303 from the encoder 302 and to process the VAMD 303 using one or more video analytics algorithms based on application requirements. Video analytics engine 304 can generate useful video analytics results, such as background model, motion alarm, virtual line detections, electronic image stabilization parameters, etc. A more detailed example of a video analytics engine 304 is shown in FIG. 1. Video analytics results can comprise video analytics messages ("VAM") that may be categorized into a global VAM class and a local VAM class. Global VAM includes video analytics messages applicable to a group of pictures, such as background frames, foreground object segmentation descriptors, camera parameters, predefined motion alarm regions coordination and index, virtual lines, etc. Local VAM can be defined as localized VAM applied to a specific individual video frame, and can include global motion vectors of a current frame, motion alarm region alarm status of the current frame, virtual line counting results, object tracking parameters, camera moving parameters, and so on.

In certain embodiments, an encoder generated video bitstream 305, VAMD 303 and VAM generated by video analytics engine 304 are packed together as a layered structure into a network bitstream 306 following a predefined packaging format. The network bitstream 306 can be sent through a network to client side 32 of the system. The network bitstream 306 may be stored locally, on a server and/or on a remote storage device for future playback and/or dissemination.

Figure 4:
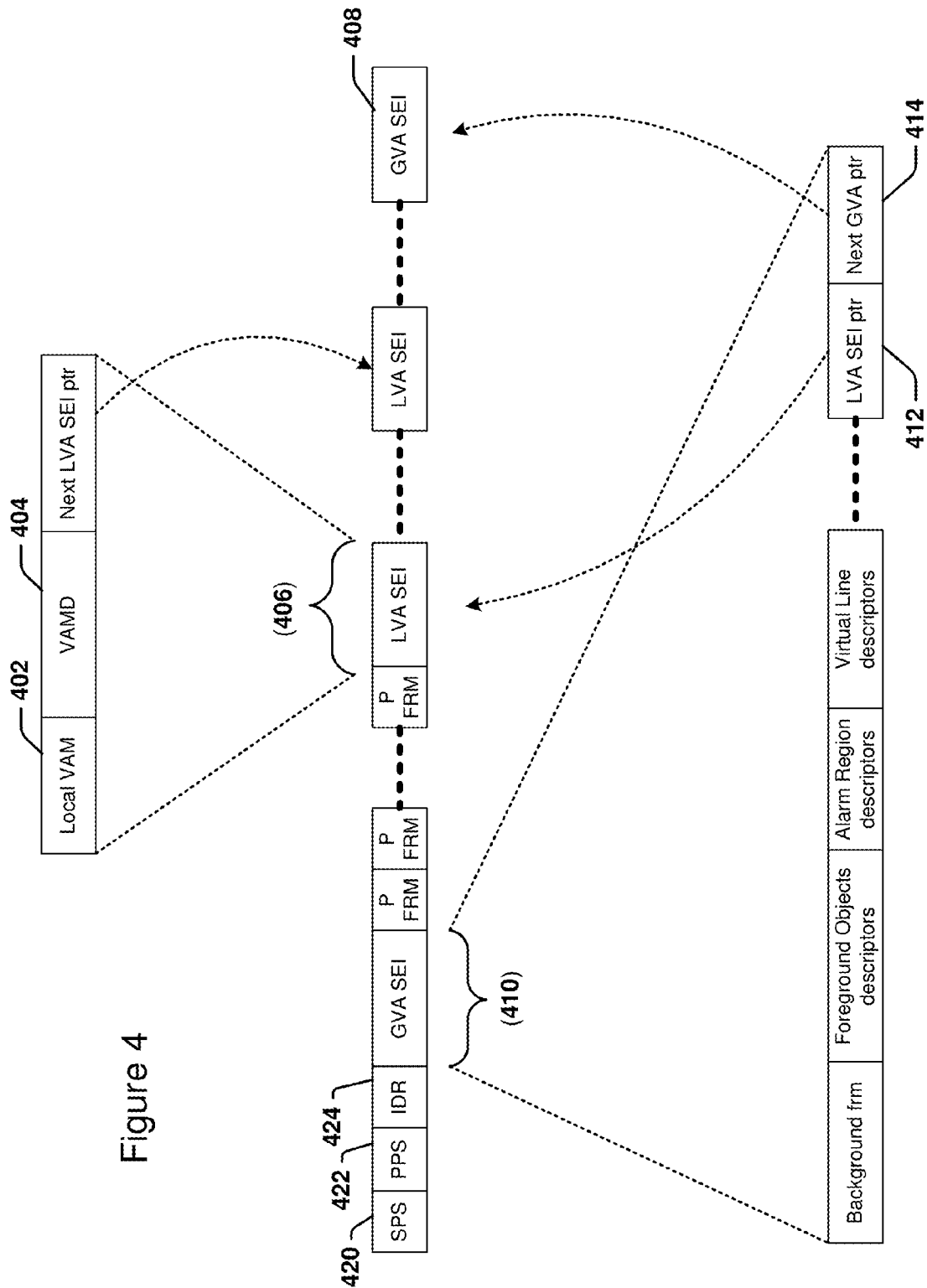
FIG. 4 depicts an example of H.264 standards-defined bitstream syntax.

FIG. 4 depicts an example of an H.264 standards-defined bitstream syntax, in which VAM 402 and VAMD 404 can be packed into a supplemental enhancement information ("SEI") network abstraction layer package unit. Following Sequence Parameter Set ("SPS") 420, Picture Parameter Set ("PPS") 422 and instantaneous decoding refresh ("IDR") 424 network abstraction layer units, a global video analytics ("GVA") SEI network abstraction layer unit 410 can be inserted into network bitstream 306. The GVA network abstraction layer unit 410 may include the global video analytics messages for a corresponding group of pictures, a pointer 412 to the first local video analytics SEI network abstraction layer location 406 within the group of pictures, and pointer 414 to the next GVA network abstraction layer unit 408, and may include an indication of the duration of frames which the GVA applicable. Following each individual frame which is associated with VAM or VAMD elements, a local video analytics ("LVA") SEI network abstraction layer unit 406 is inserted right after the frame's payload network abstraction layer unit. The LVA 406 can comprise local VAM 402, VAMD 404 information and a pointer 426 to a location of the next frame which has LVA SEI network abstraction layer unit. The amount of VAMD packed into an LVA network abstraction layer unit depends on the network bandwidth condition and the complexity of user video analytics requirement. For example, if sufficient network bandwidth is available, additional VAMD can be packed. The VAMD can be used by client side video analytics systems and may simplify and/or optimize performance of certain functions. When network bandwidth is limited, less VAMD may be sent to meet the network bandwidth constraints. While FIG. 4 illustrates a bitstream format for H.264 standards, the principles involved may be applied in other video standards and formats.

In certain embodiments of the invention, a client side system 32 receives and decodes the network bitstream 306 sent from a server side system 30. The advantages of a layered video analytics system architecture, which can include facilitating and/or enabling a balanced partition of video analytics at multiple layers, become apparent at the client side 32. Layers can include server and client layers, pixel domain layers and motion domain layers. Global video analytics messages such as background frame, segmented object descriptors and camera parameters can enable a cost efficient yet complicated video analytics in the receiver side for many advanced video intelligent applications. The VAM enables an otherwise difficult or impossible level of video analytics efficiency in term of computational complexity and analytic accuracy.

In certain embodiments of the invention, the client side system 32 separates the compressed video bitstream 325, the VAMD 323 and the VAM from the network bitstream 306. The video bitstream can be decoded using decoder 324 and provided with VAMD 323 and associated VAM to client application 322. Client application 322 typically employs video analytics techniques appropriate for the application at hand. For example, analytics may include background extraction, motion tracking, object detection, and other functions. Known analytics can be selected and adapted to use the VAMD 303 and VAM that were derived from the encoder 302 and video analytics engine 304 at the server side 30 to obtain richer and more accurate results 320. Adaptions of the analytics may be based on speed requirements, efficiency, and the enhanced information available through the VAM and VAMD 323.

Certain advantages may be accrued from video analytics system architecture and layered video analytics information embedded in network bitstreams according to certain aspects of the invention. For example, greatly improved video analytics efficiency can be obtained on the client side 32. In one example, video analytics engine 304 receives and processes encoder feedback VAMD to produce the video analytics information that may be embedded in the network bitstream 306. The use of embedded layered VAM provides users direct access to a video analytics message of interest, and permits use of VAM with limited or no additional processing. In one example, additional processing would be unnecessary to access the motion frame, number of object passing a virtual line, object moving speed and classification, etc. In certain embodiments, information related to object tracking may be generated using additional, albeit limited, processing related to the motion of the identified object. Information related to electronic image stabilization may be obtained by additional processing based on the global motion information provided in VAM. Accordingly, in certain embodiments, client side 32 video analytics efficiency can be optimized and performance can be greatly improved, consequently enabling processing of an increased number of channels.

Certain embodiments enable operation of high-accuracy video analytics applications on the client side 32. According to certain aspects of the invention, client side 32 video analytics may be performed using information generated on the server side 30. Without VAM embedded in the network bitstream 306, client side video analytics processing may have to rely on video reconstructed from the decoded video bitstream 325. Decoded bitstream 325 typically lacks some of the detailed information of the original video content (e.g. content provided by video sensor 300), which may be discarded or lost in the video compression process. Consequently, video analytics performed solely on the client side 32 cannot generally preserve the accuracy that can be obtained if the processing was performed at the server side 30, or at the client side 32 using VAMD 323 derived from original video content on the server side 30. Loss of accuracy due to analytics processing that is limited to client side 32 can exhibit problems with geometric center of an object, object segmentation, etc. Therefore, embedded VAM can enable improved system-level accuracy.

Certain embodiments of the invention enable fast video indexing, searching and other applications. In particular, embedded, layered VAM in the network bitstream enables fast video indexing, video searching, video classification applications and other applications in the client side. For instance, motion detection information, object indexing, foreground and background partition, human detection, human behavior classification information of the VAM can simplify client-side and/or downstream tasks that include, for example, video indexing, classification and fast searching in the client. Without VAM, a client generally needs vast computational power to process the video data and to rebuild the required video analytics information for a variety of applications including the above-listed applications. It will be appreciated that not all VAM can be accurately reconstructed at the client side 32 using video bitstream 325 and it is possible that certain applications, such as human behavioral analysis applications, cannot even be performed if VAM created at server side 30 is not available.

Certain embodiments of the invention permit the use of more complex server/client algorithms, partitioning of computational capability and balancing of network bandwidth. In certain embodiments, the video analytics system architecture allows video analytics to be partitioned between server side 30 and client side 32 based on network bandwidth availability, server side 30 and client side 32 computational capability and the complexity of the video analytics. In one example, in response to low network bandwidth conditions, the system can embed more condensed VAM in the network bitstream 306 after processing by the VAE 304. The VAM can include motion frame index, object index, and so on. After extracting the VAM from the bitstream, the client side 32 system can utilize the VAM to assist further video analytics processing. More VAMD 303 can be directly embedded into the network bitstream 306 and processing by the VAE 304 can be limited or halted when computational power is limited on the server side 30. Computational power on the server side 30 may be limited when, for example, the server side 30 system is embodied in a camera, a digital video recorder ("DVR") or network video recorder ("NVR"). Certain embodiments may use client side 32 systems to process embedded VAMD 323 in order to accomplish the desired video analytics function system. In some embodiments, more video analytics functions can be partitioned and/or assigned to server side 30 when, for example, the client side is required to monitor and/or process multiple channels simultaneously. It will be appreciated, therefore, that a balanced video analytics system can be achieved for a variety of system configurations.

With reference again to FIG. 1, certain embodiments provide electronic image stabilization ("EIS") capabilities 120. EIS 120 finds wide application that can be used in video security applications, for example. A current captured video frame is processed with reference to the previous reconstructed reference frame or frames and generates a global motion vector 112 for the current frame, utilizing the global motion vector 112 to compensate the reconstructed image in the client side 32 to reduce or eliminate image instability or shaking.

In a conventional pixel domain EIS algorithm, the current and previous reference frames are fetched, a block based or grey-level histogram based matching algorithm is applied to obtain local motion vectors, and the local motion vectors are processed to generate a pixel domain global motion vector. The drawbacks of the conventional approach include the high computational cost associated with the matching algorithm used to generate local motion vectors and the very high memory bandwidth required to fetch both current reconstructed frame and previous reference frames.

In certain embodiments of the invention, the video encoding engine 100 can generate VAMD 102 including block-based motion vectors, MB-type, etc., as a byproduct of video compression processing. VAMD 102 is fed into VAE 104, which can be configured to process the VAMD 103 information in order to generate global motion vector 112 as a VAM. The VAM is then embedded into the network bitstream 306 to transmit to the client side 12, typically over a network. A client side 32 processor can parse the network bitstream 306, extract the global motion information for each frame and apply global motion compensation to accomplish EIS 120.

Certain embodiments of the invention comprise a video background modeling feature that can construct or reconstruct a background image 122 which can provide highly desired information for use in a wide variety of video surveillance applications, including motion detection, object segmentation, abundant object detection, etc. Conventional pixel domain background extraction algorithms operate on a statistical model of multiple frame co-located pixel values. For example, a Gauss model is used to model N continuous frames' co-located pixels and to select the mathematical most likely pixel value as the background pixel. If a video frame's height is denoted as H, width as W and continuous N frames to satisfy the statistical model requirement, then total W*H*N pixels are needed to process to generate a background frame.

In certain embodiments, MB-based VAMD 102 is used to generate the background information rather than pixel-based background information. According to certain aspects of the invention, the volume of information generated from VAMD 102 is typically only $\frac{1}{256}$ of the volume of pixel-based information. In one example, MB based motion vector and non-zero-count information can be used to detect background from foreground moving object.

Certain embodiments of the invention provide systems and methods for motion detection 110 and virtual line counting 111. Motion detection module 110 can be used to automatically detect motion of objects including humans, animals and/or vehicles entering predefined regions of interest. Virtual line detection and counting module 111 can detect a moving object that crosses an invisible line defined by user configuration and that can count a number of objects crossing the line. The virtual line can be based on actual lines in the image and can be a delineation of an area defined by a polygon, circle, ellipse or irregular area. In some embodiments, the number of objects crossing one or more lines can be recorded as an absolute number and/or as a statistical frequency and an alarm may be generated to indicate any line crossing, a threshold frequency or absolute number of crossings and/or an absence of crossings within a predetermined time. In certain embodiments, motion detection 110 and virtual line and counting 111 can be achieved by processing one or more MB-based VAMDs. Information such as motion alarm and object count across virtual line can be packed as VAM is transmitting to the client side 32. Motion indexing, object counting or similar customized applications can be easily archived by extracting the VAM with simple processing. It will be appreciated that configuration information may be provided from client side 32 to server side 30 as a form of feedback, using packed information as a basis for resetting lines, areas of interest and so on.

Certain embodiments of the invention provide improved object tracking within a sequence of video frames using VAMD 102. Certain embodiments can facilitate client side 32 measurement of speed of motion of objects 113 and can assist in identifying directions of movement. Furthermore, VAMD 102 can provide useful information related to video mosaics 121, including motion indexing and object counting.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide video analytics systems and methods. Some of these embodiments comprise a video encoder operable to generate macroblock video analytics metadata (VAMD) from a video frame. Some of these embodiments comprise one or more modules that receive the VAMD and an encoded version of the video frame and configured to generate video analytics information related to the frame using the VAMD and the encoded video frame. In some of these embodiments, the one or more modules extract a global motion vector related to the encoded frame from the VAMD. In some of these embodiments, the one or more modules detect motion of an object within the encoded frame relative to a previous encoded frame. In some of these embodiments, the one or more modules track the object within the encoded frame and subsequent encoded frames.

In some of these embodiments, the one or more modules monitor a line within the encoded frame. In some of these embodiments, the one or more modules count traversals of the line by one or more moving objects observable within a plurality of sequential encoded frames. In some of these embodiments, the one or more modules generate an alarm when a moving object crosses the line in one of a plurality of sequential encoded frames. In some of these embodiments, the line is a physical line observable within the encoded frame. In some of these embodiments, the line is a virtual line identified in the encoded frame. In some of these embodiments, the line is one of a plurality of lines of a polygon that delineates an area observable within the encoded frame.

In some of these embodiments, the VAMD comprises one or more of a non-zero-count, a macroblock type, a motion vector, selected DC/AC coefficients after DCT transform, a sum of absolute value after motion estimation for each macroblock. In some of these embodiments, the VAMD comprises video frame level information including one or more of an A/D motion flag and a block based motion indictor generated in an analog to digital front end.

Certain embodiments of the invention provide video analytics systems and methods. Some of these embodiments comprise generating macroblock video analytics metadata (VAMD) while encoding a plurality of macroblocks in a video frame. Some of these embodiments comprise communicating an encoded version of the frame to a video decoder and at least a portion of the VAMD corresponding to the plurality of macroblocks in the frame. In some of these embodiments, a processor communicatively coupled with the video decoder uses the VAMD to generate video analytics information related to the frame using the VAMD and the encoded video frame.

In some of these embodiments, the video analytics information includes a global motion vector. In some of these embodiments, the processor detects and tracks motion of an object using the video analytics information. In some of these embodiments, the processor detects and monitors traversals of a line identified in the frame by a moving object using the video analytics information. In some of these embodiments, the line is one of a plurality of lines of a polygon that delineates an area observable within the frame.

Certain embodiments of the invention provide video analytics systems and methods. In some of these embodiments, the methods are implemented in one or more processors of a video decoder system configured to execute one or more computer program modules. In some of these embodiments, the method comprises executing, on the one or more processors, one or more program modules configured to cause the decoder to receive an encoded video frame and macroblock video analytics metadata (VAMD) generated during encoding of a plurality of macroblocks in the video frame. In some of these embodiments, the method comprises executing, on the one or more processors, one or more program modules configured to cause the processor to generate video analytics information related to an image decoded from the encoded frame using the VAMD. In some of these embodiments, the video analytics information includes a global motion vector. In some of these embodiments, the processor detects and tracks motion of an object using the video analytics information. In some of these embodiments, the processor detects and monitors traversals of a line identified in the frame by a moving object using the video analytics information.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method comprising a processor, a memory, a video sensor, a video encoder and a transceiver, the memory including instructions stored thereon which, when executed by the processor, perform a method for generating video analytics, the method comprising:
   providing, by the processor, information representative of a sequence of images captured by the video sensor to the video encoder that is adapted to encode the information using macroblock-based video encoding to obtain a plurality of video frames, wherein the video sensor and video encoder are co-located in a first apparatus;
   generating, by the processor, pixel domain video analytics metadata (VAMD) that includes video content analysis information for each of a plurality of macroblocks while encoding the information in the video encoder;
   generating, by the processor, a global video analytics message applicable to a plurality of images in the sequence of images using the VAMD;

generating, by the processor, a local video analytics message applicable to a first video frame in the plurality of video frames using the VAMD; and transmitting, by the transceiver, the plurality of video frames through a network to a second apparatus with a package comprising the VAMD and the local video analytics message or the global video analytics message, wherein the second apparatus includes a video analytics processor configured to process the package transmitted by the first apparatus.

2. The method of claim 1, wherein:

the video analytics processor in the second apparatus is configured to generate video analytics information related to the plurality of video frames based on the local video analytics message or the global video analytics message.

3. The method of claim 1, wherein the plurality of video frames is obtained by:

compressing the sequence of images.

4. The method of claim 1, wherein generating the VAMD comprises:

generating motion vectors for the plurality of macroblocks.

5. The method of claim 4, wherein the motion vectors have sub-pixel granularity.

6. The method of claim 4, wherein generating the VAMD comprises:

filtering the motion vectors to obtain one filtered motion vector for each of the plurality of macroblocks; and providing filtered motion vectors in the VAMD.

7. The method of claim 1, wherein the video encoder is embedded in a communications device.

8. The method of claim 1, wherein the video encoder is provided in a device that functions as a camera.

9. The method of claim 1, wherein:

the global video analytics message includes information related to a background frame, a foreground object segmentation descriptor, a camera parameter, predefined motion alarm regions coordination and index, or a virtual line; and the local video analytics message includes information related to global motion vectors, motion alarm region alarm status, virtual line counting results, object tracking parameters, or camera moving parameters.

10. A device comprising:

a camera;

a video encoder;

a video analytics engine;

a communication interface; and a video sensor in the camera configured to capture a sequence of images;

the video encoder configured to:

encode the sequence of images in video frames using macroblock-based video encoding to provide encoded video frames, and generate video analytics metadata (VAMD) that includes video content analysis information for each of a plurality of macroblocks processed the sequence of images in the video frames;

the video analytics engine configured to process the VAMD, and to generate one or more video analytics messages from results obtained by processing the VAMD; and the communication interface configured to transmit the encoded video frames to a video decoder of a client device, and to transmit the VAMD and the one or more video analytics messages in a layered package to a video analytics processor in the client device that is configured to generate video analytics information related to the sequence of images based on the VAMD, the one or more video analytics messages, and the encoded video frames.

11. The device of claim 10, wherein the encoded video frames include compressed video frames.

12. The device of claim 10, wherein the VAMD comprises motion vectors generated for the plurality of macroblocks.

13. The device of claim 10, wherein the one or more video analytics messages comprises at least one global video analytics message applicable to a plurality of images in the sequence of images or at least one local video analytics message applicable to a first video frame in the encoded video frames.

14. The device of claim 10, wherein the video sensor is provided in a camera.

15. An apparatus comprising:

a camera;

a video encoder configured to provide encoded video frames representative of images received from the camera using macroblock-based video encoding, wherein the video encoder is further configured to generate video analytics metadata (VAMD) that includes video content analysis information for each of a plurality of macroblocks processed while encoding the images;

a video analytics engine configured to process the VAMD, and to generate a global video analytics message applicable to a plurality of images in the images received from the camera or a local video analytics message applicable to one of the encoded video frames; and a communication interface adapted to transmit the encoded video frames to a video decoder of a client device, and to transmit the VAMD, global video analytics message or the local video analytics message in a layered package to a video analytics processor in the client device that is configured to generate video analytics information related to the images received from the camera based on the VAMD, the global video analytics message or the local video analytics message, and the encoded video frames.

16. The apparatus of claim 15, wherein the encoded video frames include compressed video frames.

17. The apparatus of claim 15, wherein the VAMD comprises motion vectors generated for the plurality of macroblocks.

18. The apparatus of claim 15, wherein the global video analytics message includes information related to a background frame, a foreground object segmentation descriptor, a camera parameter, predefined motion alarm regions coordination and index, or a virtual line.

19. The apparatus of claim 15, wherein the local video analytics message includes information related to global motion vectors, motion alarm region alarm status, virtual line counting results, object tracking parameters, or camera moving parameters.

20. The apparatus of claim 15, wherein results obtained by processing the VAMD include information related to motion indexing, background extraction, object segmentation, motion detection, virtual line detection, object counting, motion tracking, speed estimation, a background model, a motion alarm, virtual line detections, or electronic image stabilization parameters.

* * * * *

UNITED STATES PATENT AND TRADEMARK OFFICE
CERTIFICATE OF CORRECTION

PATENT NO. : 9,609,348 B2
APPLICATION NO. : 14/472313
DATED : March 28, 2017
INVENTOR(S) : Shi et al.

It is certified that error appears in the above-identified patent and that said Letters Patent is hereby corrected as shown below:

On the Title Page

On Page 3, in item (56), under "OTHER PUBLICATIONS", in Column 1, Line 3, delete "Bases Approch" and insert -- Based Approach --, therefor.

In the Specification

In Column 1, Line 7, delete "Application" and insert -- application --, therefor.

In Column 1, Line 11, delete "Analysis)" and insert -- Analysis") --, therefor.

In Column 2, Line 37, delete "102 (VAMD)" and insert -- (VAMD) 102 --, therefor.

In Column 5, Line 39, delete "and or" and insert -- and/or --, therefor.

In Column 5, Line 48, delete "systems 200." and insert -- systems 20. --, therefor.

In Column 6, Lines 24-25, delete "system 200." and insert -- system 20. --, therefor.

In Column 7, Lines 8-9, delete "computing system 204," and insert -- computing system 20, --, therefor.

In Column 7, Lines 39-40, delete "may used" and insert -- may be used --, therefor.

In Column 7, Line 46, delete "are network" and insert -- area network --, therefor.

In Column 8, Line 48, delete "video bitstream 303." and insert -- video bitstream 305. --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,609,348 B2

In Column 8, Line 57, delete "sum of absolute value ("SAD")," and insert -- sum of absolute differences ("SAD"), --, therefor.

In Column 10, Line 59, delete "Decoded bitstream 325" and insert -- Decoded video bitstream 325 --, therefor.

In Column 11, Lines 55-56, delete "capabilities 120." and insert -- 120 capabilities. --, therefor.

In Column 12, Line 8, delete "engine 100" and insert -- engine --, therefor.

In the Claims

In Column 16, Lines 12-17, in Claim 13, delete "wherein......frames." and insert the same at Line 11, after "claim 10,", as continuation sub-point.